Dec. 7, 1937.　　　　　L. O. CARLSEN　　　　　2,101,237

MACHINE FOR PRODUCING GEARS

Filed Sept. 9, 1935　　　　4 Sheets-Sheet 1

Inventor
Leonard O. Carlsen
By B. F. Shlesinger
Attorney

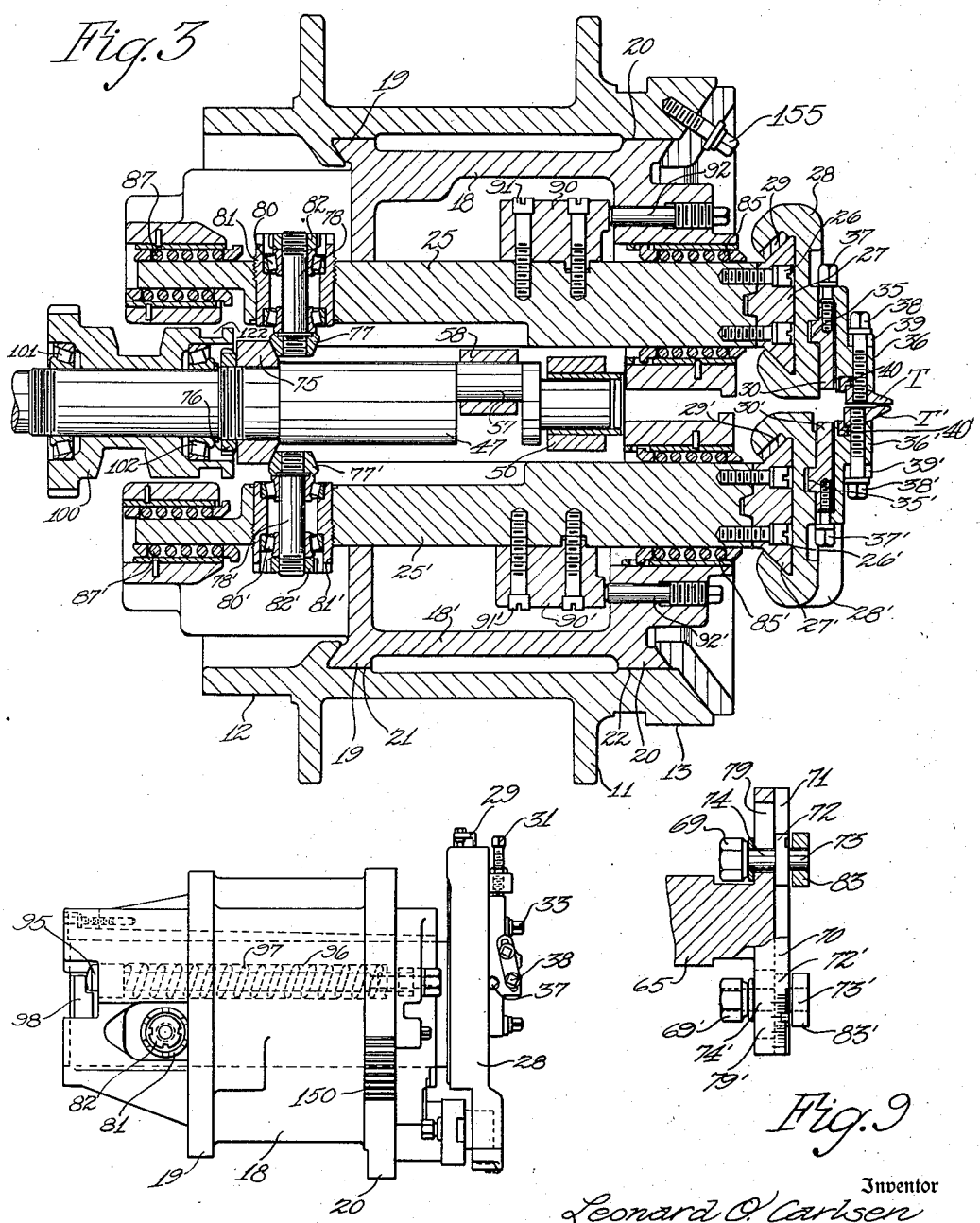

Dec. 7, 1937.    L. O. CARLSEN    2,101,237
MACHINE FOR PRODUCING GEARS
Filed Sept. 9, 1935    4 Sheets-Sheet 4
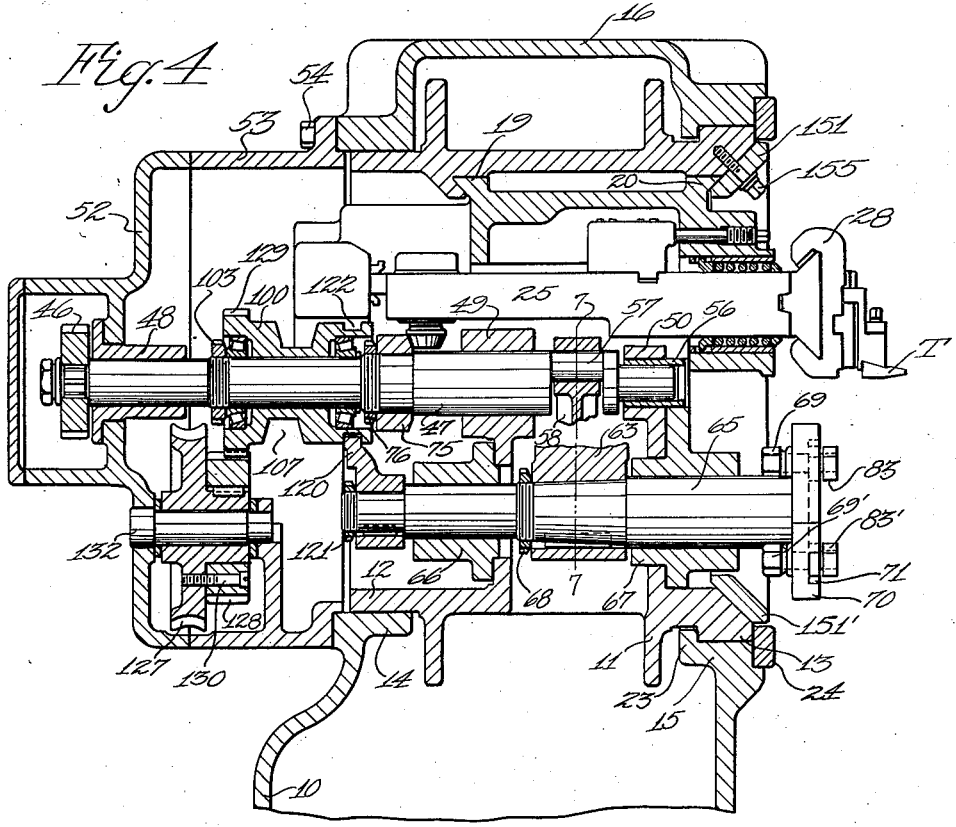
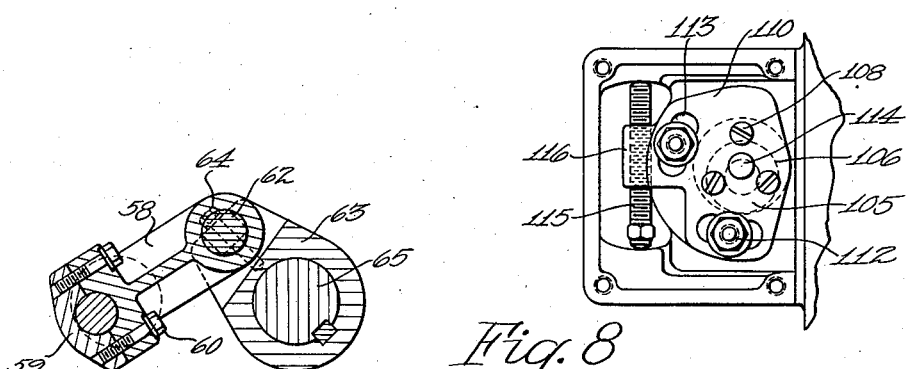
Inventor
Leonard O. Carlsen
By
R. E. Schlesinger
Attorney Patented Dec. 7, 1937

2,101,237

UNITED STATES PATENT OFFICE 2,101,237

MACHINE FOR PRODUCING GEARS

Leonard O. Carlsen, Rochester, N. Y., assignor to Gleason Works, Rochester, N. Y., a corporation of New York Application September 9, 1935, Serial No. 39,675

16 Claims. (Cl. 90—9)

The present invention relates to gear cutting machines and especially to tool mechanism for such machines and particularly to tool mechanism of the reciprocating type for machines for cutting bevel and hypoid gears.

In reciprocating tool mechanisms ordinarily employed for cutting gears, the tool is moved from and to cutting position at opposite ends of its stroke by a swinging motion. The tool is mounted upon a clapper block that is pivotally mounted on the reciprocating tool slide. In machines of the intermittent indexing type, the pivotal clapping movement is effected usually by friction, but in the machines for cutting in a continuous indexing operation, the clapping mechanism is ordinarily positively actuated.

The pivotal clapping mechanism is noisy and, where a friction operating means is employed, is open to the further, very serious objection that the movement of the tool to and from cutting position is not adjustable with reference to the stroke of the tool slide. The same amount of movement of the tool slide in either direction must take place, after reversal of the slide, in order to swing the tool into cutting position or withdraw it therefrom. The result is that for a given job, the tool may not be moved into cutting position until the tool slide is traveling at high speed with the consequence that the tool will strike the work with considerable force, setting up a chatter and causing a poor tooth surface finish. The force of impact of the rapidly traveling tool upon the relatively stationary blank also causes comparatively rapid dulling of the tool.

A principal object of the present invention is to provide an improved reciprocating tool mechanism in which the movements of the cutting tool to and from cutting position at the ends of its stroke may be effected positively and at any desired point in the stroke.

A further object of the invention is to provide a reciprocating tool mechanism which will be substantially silent in operation.

Another object of the invention is to provide an improved reciprocating tool mechanism in which the tool will be held positively in cutting position during the cutting stroke so as effectually to obviate any chatter during cutting.

A further object of the invention is to provide a reciprocating tool mechanism in which the movement of the tool to and from cutting position is effected by a bodily displacement of the tool at right angles to the direction of the cutting stroke so that the tool can be moved quickly clear of the work at the end of the cutting stroke and quickly returned into cutting position at the end of the idle, return stroke.

Another object of the invention is to provide improved means for supporting the reciprocating tool mechanism in a bevel gear cutting machine, so as to provide a firm and rigid support for the same in any position of angular adjustment of the tool slide.

In the preferred embodiment of the present invention, the tool is secured directly to the tool slide, which is reciprocated to produce the cutting stroke, and the slide is mounted upon a ram which is moved intermittently by a cam in a direction at right angles to the direction of stroke of the slide to move the tool to and from cutting position. The ram is mounted in an adjustable rocker member which is semi-cylindrical in shape and which can be adjusted angularly to adjust the direction of the path of the tool in its cutting stroke.

The invention is shown as applied to a machine of the type disclosed in the U. S. patent to Bauer and Carpenter, No. 2,000,209, of May 7, 1935. Through the use of the improved reciprocating tool mechanism of the present invention, it has been possible to make certain improvements in the finishing tool end of the Bauer et al. machine and these improvements also constitute part of the present invention.

In the machine of the Bauer et al. patent, the alternate feed and withdrawal movements of the tools for depth of cut and indexing purposes, respectively, are produced by reciprocation of a slide upon which the whole tool mechanism is mounted and this slide is mounted upon a semi-cylindrical cradle which is oscillated to produce the generating motion of the tools. In the improved construction of the present invention, the feed and withdrawal motions of the tools are produced by bodily movement of the rams which, as above described, also produce the movements of the tools to and from cutting position at the ends of the tool strokes. Further, the rams are mounted in angularly adjustable rocker members that, in turn, are mounted in a full circular cradle which is oscillated to produce the generating motion. In the new construction, one of the moving parts is eliminated, because the feed motion is imparted to the same parts, namely, the rams, which are actuated to produce the relieving motion of the tools. Further, the feed movement is more direct, being in line with the cut and can be more positively controlled and the whole finishing end of the machine is simpler and more compact.

A further advantage of the present invention is the reduction in weight of the parts which move during cutting. Where the clapper blocks are mounted on the slides, the weight of the slides is very materially increased and there is much greater liability of vibration than in the mechanism of the present invention.

A still further advantage of the present invention is the reduction in length of stroke of the tool slides which it makes possible. This effects a great saving in the time of cutting a gear. The tools can be moved to and from cutting position at the ends of the stroke of slide while the crank, which reciprocates the slides, is rotating through that angle of its movement which is least effective in producing lengthwise movement of the slides. Over-travel of the slides beyond the ends of the gear teeth is therefore held to a minimum.

The principal objects of the invention have been described above. Other objects of the invention will be apparent hereinafter from the specification and from the recital of the appended claims.

In the drawings:

Fig. 3 is a sectional view through the tool mechanism, taken substantially on the line 3—3 of Fig. 1;

Fig. 4 is a developed sectional view through the tool mechanism on a slightly smaller scale than Fig. 3 and taken substantially on the line 4—4 of Fig. 1;

Fig. 6 is a plan view on a greatly reduced scale of one of the rocker members and associated parts;

Fig. 7 is a fragmentary sectional view on the line 7—7 of Fig. 4, showing part of the mechanism for oscillating the tool slides;

Fig. 8 is a fragmentary view showing in detail the means for adjusting the depth of tool feed; and Fig. 9 is a detail of the driving connection between the actuating plate and the tool slides.

Figure 1:
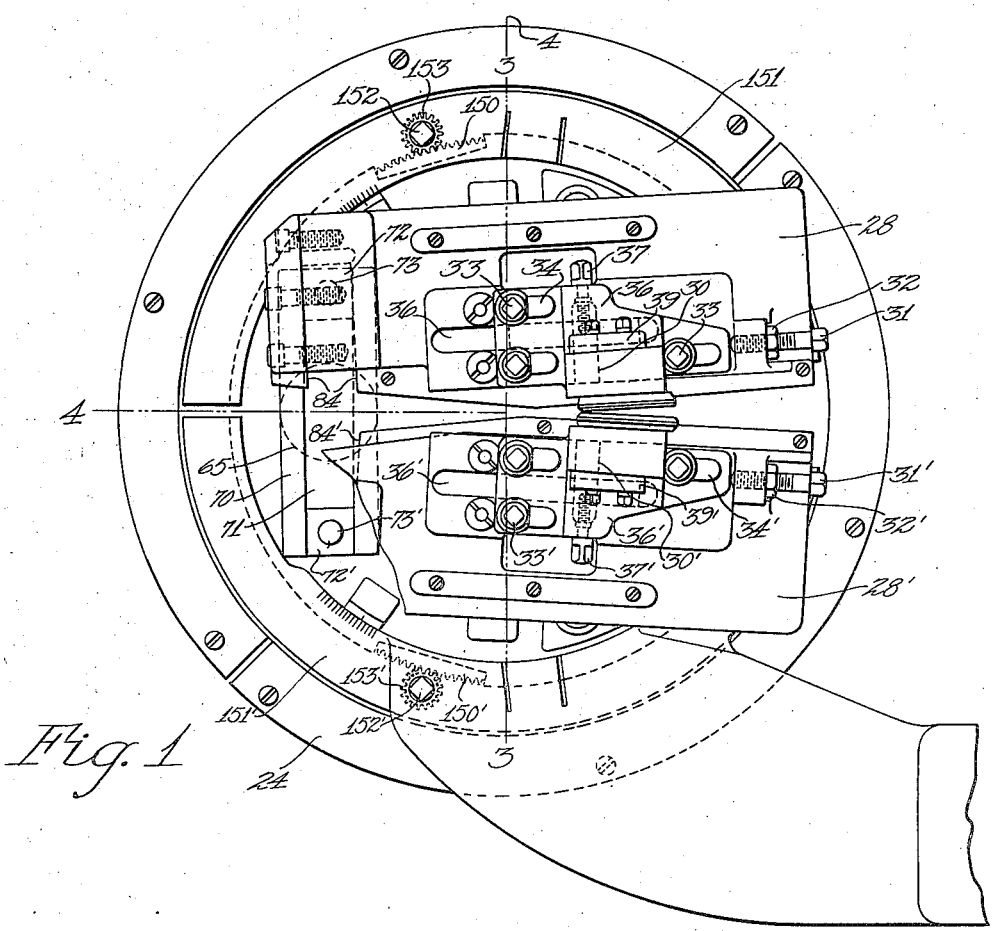
Fig. 1 is a fragmentary view, showing in side elevation a reciprocating tool mechanism constructed according to the preferred embodiment of the present invention.

The invention for convenience will be described in connection with one possible application to a machine of the type of the Bauer et al. patent. It will be understood, however, that it is capable of many different uses.

In the drawings, 10 denotes a column of a machine of the type disclosed in the Bauer et al. patent and which may be substituted for the corresponding column shown in the Bauer et al. patent. Oscillatably mounted in the column is a cradle 11 (Fig. 4) which has full circular guide or bearing surfaces 12 and 13. These bearing surfaces are adapted to engage full circular ways 14 and 15, respectively, that are formed partly upon the column 10 and partly upon the cap member 16 which is secured to the column 10 by bolts 17 (Fig. 2). The cradle is held against axial movement on the column by a flange or shoulder 23 formed on the column and by the semi-circular retaining plates 24 (Figs. 1 and 4) which are bolted to the column and to the cap member 16.

Figure 5:
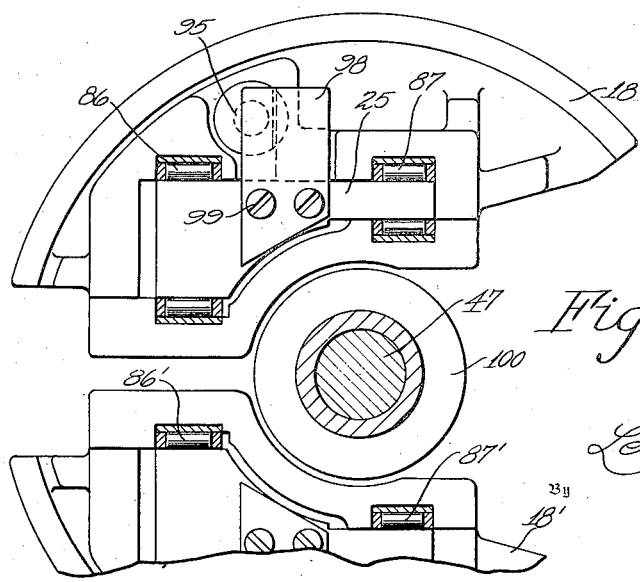
Fig. 5 is a fragmentary end elevation, looking at the rear of the tool rams and showing also the supporting rocker members therefor.

Mounted in the cradle 11 for angular adjustment therein are a pair of rocker members 18 and 18' (Figs. 3 and 5). Each of these rocker members is formed with arcuate guide or bearing surfaces 19 and 20 that are adapted to engage and seat on cylindrical ways 21 and 22, respectively, formed internally in the cradle. One of the rocker members 18 carries the upper tool of the tool mechanism, the upper tool slide and the parts for imparting the relieving motion to this tool. The other rocker member 18' carries the lower tool, the lower tool slide and the parts for imparting the relieving motion to this tool. The two rocker members and the parts carried thereby are identical in construction save for the reversal of parts required due to the different positions of the two tools. In the following description, only one of the rocker members will be described in detail and corresponding parts of the other rocker unit will be denoted by corresponding reference numerals primed.

Mounted upon the rocker members 18 and 18', respectively, for reciprocation in a direction parallel to the axis of the cradle are rams 25 and 25', respectively. Secured to the front ends of the rams 25 and 25', respectively, by screws 26 and 26', respectively are dove-tailed guides 27 and 27', respectively. These guides extend at right angles to their respective rams.

The upper tool slide 28 is mounted to slide upon the dove-tailed guide 27 and the lower tool slide 28' upon the dove-tailed guide 27'. Gibs 29 and 29', respectively, are provided to take up wear of the slides or guides with use.

Mounted upon the tool slide 28 for longitudinal adjustment thereon is a cross-shaped plate 30 (Figs. 3 and 1) and mounted upon the tool slide 28' for longitudinal adjustment thereon is a corresponding plate 30'. The plates 30 and 30' are provided with tongues 35 and 35', respectively, which engage in elongated slots 36 and 36', respectively formed in the slides 28 and 28', respectively and which guide the plates in their adjustment on the slides.

Adjustably mounted upon the plate 30 is a tool holder 36 and adjustably mounted upon the plate 30' is a tool holder 36'. The vertical portions of the plates 30 and 30', respectively, fit into slots formed in the backs of these tool holders, as clearly shown in Fig. 3, and form guides upon which the tool holders are adjustable. The upper tool holder 36 is adjusted upon the plate 30 by a screw 37, while the screw 37' serves to adjust the lower tool holder 36' upon the plate 30'.

The tool holder 36 is adjusted longitudinally upon the upper tool slide 28 by a screw 31 which threads into the upper tool slide and abuts against one end of the tool holder 36 while the lower tool holder 36' is adjusted upon the lower tool slide 28' by a screw 31' which threads into the lower tool slide and abuts against one end of the tool holder 36'. Locknuts 32 and 32', respectively, are provided for the two adjusting screws. The tool holders 36 and 36', respectively, are secured to the upper and lower tool slides, respectively, in any position of their described longitudinal and lateral adjustments thereon by bolts 33 and 33', respectively, which pass through elongated slots 34 and 34', respectively in the tool holders 36 and 36', and thread into the upper and lower tool slides 28 and 28', respectively. The lateral adjustment required at any time for the tool holders is very slight and the slots 34 and 34' are enough wider than the stems of the bolts 33 and 33' to permit this adjustment to be made readily.

The upper tool T is secured to the upper tool holder 36 by screws 38 and the lower tool T' is secured to the lower tool holder 36' by screws 38'. Wedge shaped washers 39 and 39', respectively, are provided in conjunction with the two tool holders to prevent slippage of the two tools and wedge members 40 and 40', respectively, are provided in conjunction with the two tools to adjust the two tools for pressure angle. The use of these wedge members is old in the art and need not be further described here. The two tools T and T' shown are planing tools of standard construction such as are ordinarily employed in cutting straight tooth bevel gears.

The tool slides 28 and 28' are reciprocated on the guides 27 and 27' to move the tools lengthwise of the tooth surfaces of the gear being cut and the tools cut on the strokes of the slides in one direction and are withdrawn clear of the blank on their return strokes. The movement of the tools to and from cutting position at the ends of the strokes of the tool slides, is effected by movement of the rams 25 and 25'. The mechanism for reciprocating the tool slides will be described first.

Mounted upon the column 10 is a drive motor 140 (Fig. 2) which drives through a suitable coupling, the bevel pinion 142. This pinion meshes with a bevel gear 143 which is secured to a shaft 144. The shaft 144 has a spur gear 149 secured to it which meshes with a spur gear 46. The latter gear has a splined connection with a crank shaft 47 (Fig. 4). The crank shaft 47 is rotatably and slidably mounted in bearings 48, 49 and 50, the bearing 48 is secured in the cover plate 52 of the gear housing 53 that is secured by bolts 54 to the column 10 and cap member 16.

The bearings 49 and 50 are integral with the cradle 11. A bushing 56 is mounted in the bearing 50 for direct support of the front end of the crank shaft. The parts 140, 142, 143, 144 and 149 correspond to the identically numbered parts shown in the Bauer et al. patent and may be identical with these parts.

The shaft 47 is of reduced diameter as denoted at 57 to form the crank. A connecting arm 58 (Figs. 4 and 7) is connected to this portion 57 of the shaft by a cap member 59 and bolts 60. The connecting arm 58 is secured to a shaft 62 that is suitably mounted in the cradle. An arm 63 is secured to the shaft 62 by bolts 64 and this arm is keyed to a shaft 65. The shaft 65 is journaled in the bearings 66 and 67 which are suitably secured to the cradle 11. The arm 63 is held against axial movement on the shaft 65 by a nut 68 which threads onto the shaft and holds the arm 63 against a shoulder formed on the shaft.

Figure 2:
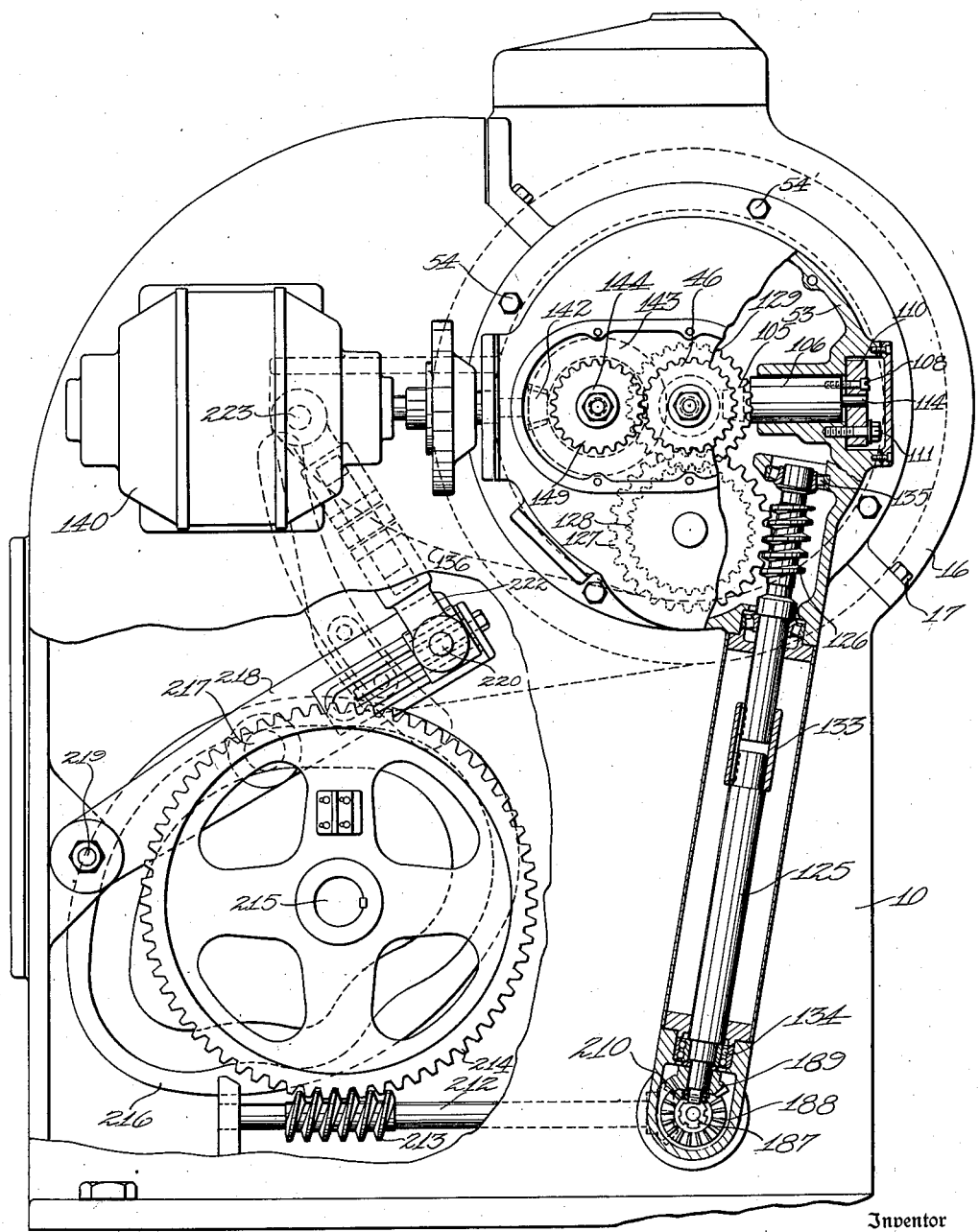
Fig. 2 is a view looking at the rear of the column of a gear cutting machine upon which the tool mechanism is mounted, and showing parts of the drive to the tool mechanism and to the cradle.

The shaft 65 is formed at its front end with an enlarged head or plate 70 (Figs. 4, 9 and 1). A diametrical slot or groove 71 is formed in the front face of this plate and a pair of blocks 72 and 72' are adjustably mounted in this groove for adjustment radially of the axis of the shaft 65. The blocks 72 and 72' are secured in any adjusted position on the actuating plate 70 by nuts 69 and 69', respectively. These nuts thread on the pins 74 and 74', respectively, which are integral with the blocks 72 and 72', respectively, and extend rearwardly therefrom through the slots 79 and 79', respectively, in the actuating plate.

Pins 73 and 73', which are integral with the blocks 72 and 72', respectively, extend forwardly from these blocks and form pivots for blocks 83 and 83', respectively, which engage, respectively, in slots formed in the slides 28 and 28'. Sidewalls of these slots in the slides are indicated at 84 and 84', respectively in Fig. 1.

From the preceding description it will be seen that as the crank shaft 47 rotates, an oscillating movement is imparted to the shaft 65 and plate 70 and that the oscillating plate 70 through the block and pin connections described imparts reciprocating movements to the upper and lower tool slides. Since these slides are connected to the plate 70 on opposite sides of the shaft 65, the tool slides move simultaneously in opposite directions.

The rams 25 and 25' are reciprocated to move the tool slides to and from cutting position and they, too, move in opposite directions so that as the tool slides reciprocate one tool is in cutting position and moving in one direction and the other tool is in relieved (non-cutting) position and moving in the opposite direction. The movements of the rams are controlled from a cam 75 (Fig. 3) which is keyed to the crank shaft 47 and which is secured against axial movement relative to that shaft by a nut 76 which threads onto the shaft and holds the cam against a shoulder formed on the shaft. The cam is a face cam and engages with a pair of rollers 77 and 77' that are secured respectively, to studs 78 and 78'. These studs are journaled on sets 80 and 80' respectively, of anti-friction bearings in sleeves 81 and 81', respectively, that are threaded, respectively, in the rams 25 and 25'. The studs are locked against axial movement relative to the sets of bearings 80 and 80' by nuts 82 and 82', respectively.

The operative front face of the cam 75 is formed with two dwells and with a rise and a return connecting these two dwell portions. The rise is to move the tool slides to cutting position, the following dwell is to hold the tools in cutting position during the cutting strokes of the tool slides, the return is to move the tool slides from cutting position at the ends of their cutting strokes and the second dwell is to hold the tool slides out of cutting position during their return strokes. Since the two rollers 77 and 77' engage the cam 75 at diametrically opposed points one tool will be out of cutting position while the other tool is in cutting position and one tool will be moved into cutting position while the other is being withdrawn therefrom. The cam 75 being mounted on the crank shaft 47 is directly timed to the rotation of the crank shaft. In each revolution of the crank shaft, each tool slide makes a forward stroke and a return stroke and during its forward stroke, the tool slide is in cutting position while during its return stroke, the tool slide is in relieved (non-cutting) position.

To make the movements of the rams as smooth as possible and to minimize the frictional resistance to their movements and reduce the power consumption, it has been found desirable to mount the rams upon anti-friction bearings, as shown. The rams are of considerable lateral dimention and are of the cross sectional shape shown most clearly in Fig. 5. At its front end, the ram 25 is mounted in sets of spaced roller bearings 85 and at its rear end in sets of spaced roller bearings 86 and 87. The ram 25' is mounted in corresponding sets of roller bearings 85', 86' and 87'.

The rollers 77 and 77' are held against the operative surface of the cam 75 and the rams 25 and 25' are moved clear of the blank at the end of the cutting strokes by separate spring-pressed plungers, one of which is denoted at 95 in Fig. 6. Each plunger is housed in a rocker member and extends parallel to a ram. The bore of the rocker member 18 in which the plunger 95 is housed is designated at 96 and the coil spring which actuates this plunger is designated at 97. The plunger engages at its rear end with a plate 98 (Figs. 5 and 6) which is secured by screws 99 to the rear end of the ram 25.

The tools make a plurality of cutting strokes during the cutting of a tooth of the gear blank, being fed into the blank to cut the tooth to the desired depth. After the desired depth of tooth has been cut, the tools are withdrawn fully clear of the blank and the blank is indexed.

The feed of the tools into depth and their periodic withdrawal for indexing is effected by a cam 100 that is rotatably mounted upon the cam shaft 47 (Figs. 3 and 4). This cam 100 is mounted upon anti-friction bearings 101 and 102 which are mounted upon the shaft. The cam is held against axial movement relative to the shaft by the nut 103 which threads onto the shaft 47 and engages the inner races of the bearing 101.

A roller 105 (Fig. 2) which is secured to a stud 106, engages in the track way 107 of the cam 100. This stud is secured to the housing 53 in a manner now to be described so that as the cam 100 rotates, axial movement will be imparted to the cam and to the shaft 47 and the parts affixed thereto.

The stud 106 is secured by screws 108 to a plate 110. This plate 110 is adjustably secured by bolts 111 to the housing 53. The bolts 111 pass through arcuate slots 113 in the plate 110 and thread into the housing.

There is a pin 114 integral with the stud 106 and projecting from the outer end thereof. This pin is eccentric of the roller 105, as clearly shown in Fig. 8. The result is that when the plate 110 is adjusted angularly, the feed cam 100 will be moved axially and with it the rams 25 and 25' to determine the depth of feed of the tools T and T' into the work. The angular adjustment of the plate 110 is effected by rotation of the screw 115 which threads into a lug 116 that is integral with the plate 110. The screw 115 abuts at its opposite ends against the walls of the pocket in the housing 53 in which the plate 110 is mounted.

The track of the cam 100 is so designed as to produce successively the required feed movement to the tools into full depth position, the withdrawal of the tools fully clear of the blank after the tooth has been cut to full depth, and a dwell while the tools are withdrawn which is of sufficient duration to permit the indexing of the blank to be completed before the feed begins anew.

Positive stops are provided to limit the forward movements of the ram and determine precisely the positions of the tools on their cutting strokes. The positive stops comprise blocks 90 and 90', respectively, which are secured by screws 91 and 91', respectively, to the rams 25 and 25', respectively. These blocks are adapted to engage with studs 92 and 92', respectively, which are threaded into the rocker members 18 and 18', respectively.

To maintain alignment between the actuating plate 70 and the tool slides 28 and 28' throughout the whole of the feed and withdrawal movements and in any depth-wise adjustment of the tools, means is provided for moving the shaft 65 axially when the crank shaft 47 is moved axially. This means comprises a yoke-member 120 which is keyed to the shaft 65 and which is held against axial movement relative thereto by a nut 121. The yoke-member 120 (Fig. 4) is adapted to engage in a circular groove 122 that is formed in the cam member 100. As the cam member 100 is moved axially on the shaft 47 due to the engagement of the roller 105 with the track of the cam member, the yoke member 120 will also be moved axially and impart the desired movement to the actuating plate 70 to maintain this plate at all times in correct alignment with the tool slides.

The cam 100 is driven from a shaft 187 (Fig. 2) through the bevel gearings 188, 189, the shaft 125, the worm wheel 126, the worm wheel 127 (Figs. 2 and 4) the spur gear 128 and the spur gear 129. The spur gear 129 is integral with the cam 100. The spur gear 128 is keyed to the hub of the worm wheel 127 and is secured to the worm wheel by screws 130. The worm wheel 127 is journaled on a stub shaft 132 that is secured at opposite ends in the housing 53 and in the cover 52 therefor. The shaft 125 which is made in two parts connected together by the couplings 133 is journaled at opposite ends on anti-friction bearings 134 and 135, respectively, in the column 10 and housing 53, respectively.

The oscillating generating motion of the cradle 11 is produced by rotation of a cam 216. This cam is driven from the shaft 187 (Fig. 2) through bevel gearing including the gear 210, the shaft 212, the worm 213 and the worm wheel 214. The cam 216 and worm wheel 214 are keyed to a common shaft 215. A roller 217 engages in the track of the cam 216. This roller is mounted in a lever arm 218 which is pivoted at 219 in the column of the machine. The lever 218 is slotted at its other end to receive the T-bolt 220 which connects the lever pivotally with the lower end of a turn-buckle 222. The upper end of this turn-buckle is pivotally connected by means of the pin 223 with the arm 136 that extends from one side of the cradle 11.

The parts 187, 188, 189, 210, 212, 213, 214, 215, 218, 219, 220, 222 and 223 may be the same parts as are denoted by the same reference numerals in the machine of the Bauer et al. patent.

The adjustment of the tools for tooth angle to conform to the angle of lengthwise convergence of the opposite sides of the teeth of a tapered gear to be cut is effected by angular adjustment of the rocker members 18 and 18'. There are segments 150 and 150' (Figs. 1 and 6) secured to the rocker members 18 and 18', respectively. Journaled in the gibs 151 and 151' which hold the rocker members against axial movement in the cradle 11 are stub shafts 152 and 152' to which are secured pinions 153 and 153' which mesh with the segments 150 and 150' respectively. By rotating the stub shafts 152 and 152', the rocker members can be adjusted accurately to cause the tools to travel in paths converging at any desired angle. The gibs 151 and 151' are graduated to read against zero marks on the face of the cradle to permit this adjustment to be made accurately. The gibs 151 and 151' are semi-circular and are secured to the cradle by screws 155 (Fig. 4).

The operation of the improved tool mechanism will be apparent from the preceding description, but may be briefly summed up here.

As the shaft 47 rotates, an oscillating motion is imparted to the shaft 65 through the linkage 58—63 (Figs. 4 and 7). This produces an oscillating motion of the actuating plate 70 which through the blocks 72 and 72', the pins 73 and 73' and blocks 83 and 83' imparts reciprocating movement to the tool slides 28 and 28', causing the tools T and T' to move longitudinally back and forth across the face of the gear being cut.

The connections of the tool slides with the actuating plate are such that when one tool is cutting, the other tool is clear of the cut and is being returned. The cam 75 (Fig. 4) which is secured to the shaft 47 and which rotates therewith operates the rams 25 and 25' upon which the tool slides are mounted to move the tools to and from cutting position, maintain them in cutting position during the cutting strokes and maintain them out of cutting position during the return strokes of the slides.

During the whole of the time that the tools are reciprocating back and forth, they are also fed into the gear blank to cut teeth of the desired depth. This feed movement is produced by a depthwise movement of the rams 25 and 25' through the action of the feed cam 100. This cam engages the stationary roller 105 and is secured to the shaft 47 so as to impart an axial movement to the shaft 47 as the cam rotates. The actuating plate 70 is maintained in alignment with the tool slides during the feed movement and subsequent withdrawal by action of the yoke-member 120 which engages in the slot 122 of the cam 100 and which causes the shaft 65 to be moved axially as the cam 100 is moved axially.

When opposite sides of a tooth of the gear have been cut by the reciprocating tools, the tools are withdrawn clear of the blank by action of the cam 100 and the spring-pressed plungers 95 which hold the rollers 77 and 77' against the cam 75. When the tools have been withdrawn, the blank may be indexed.

While the invention has been described in connection with a machine of the type of the Bauer et al. patent, it will be obvious that it is directly applicable to any type of machine employing reciprocating tools for cutting straight bevel gears and moreover, that the features thereof are applicable to any machine employing a planing tool for cutting gears either with straight or longitudinally curved teeth and either tapered or cylindrical. The present application is intended to cover any variations, uses, or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. In a machine for producing tapered gears, a frame having internal circular ways, a cradle mounted on said ways and oscillatable on said frame and having an internal bore and circular ways formed internally therein which are spaced from one another longitudinally of the bore, a pair of supporting members mounted in the bore of said cradle and each having spaced arcuate bearing surfaces to seat on said ways, a tool slide reciprocably mounted on each of said supporting members, a tool mounted on each slide, means for adjusting said supporting members angularly on said cradle to adjust the paths of movement of the tool slides relative to one another, and means carried by the cradle for reciprocating the tool slides.

2. In a gear cutting machine, a support, a pair of rams reciprocably mounted on said support, a tool slide reciprocably mounted on each ram for movement in a direction at an angle to the direction of movement of the ram, means for simultaneously reciprocating said slides in opposite directions, a single cam for controlling the movements of said rams and adapted to move the tool slides to and from cutting position at opposite ends of the strokes of said slides, and means operatively connecting said rams to said cam at diametrically opposed points of the cam path so that when one slide is in cutting position, the other slide is removed therefrom.

3. In a gear cutting machine, a support, a ram reciprocable in said support, a slide reciprocable on said ram in a direction at an angle to the direction of reciprocation of said ram, a rotatable crank-shaft, means operatively connecting the crank-shaft to said slide to reciprocate the same to effect cutting and return strokes of said slide, a cam secured to said crank-shaft and operatively connected to said ram to reciprocate the same to move the tool slide to and from cutting position at opposite ends of its stroke, means for rotating said shaft, and means for moving said shaft bodily to effect depthwise feed movement of the tool.

4. In a gear cutting machine, a support, a ram reciprocable in said support, a slide reciprocable on said ram in a direction at an angle to the direction of reciprocation of said ram, a rotatable crank-shaft, means operatively connecting the crank-shaft to said slide to reciprocate the same, a cam secured to said crank-shaft and operatively connected to said ram to reciprocate the same, a second cam rotatably mounted on said crank-shaft but secured against axial movement relative thereto, a member cooperating with said second cam and fixed to said support, means for rotating said second cam to impart depthwise feed and withdrawal movements to the tool, and means for rotating said crank-shaft to impart alternate cutting and return movements to said tool slide and alternately move the same to and from cutting position.

5. In a gear cutting machine, a support, a pair of rams reciprocably mounted in said support, a slide reciprocably mounted on each of said rams for movement in a direction at right angles to the direction of movement of the rams, a tool secured to each slide, a rotatable crank-shaft, means operatively connecting said shaft to said slides to reciprocate said slides simultaneously in opposite directions on rotation of said shaft, a cam secured to said crank-shaft to rotate therewith and adapted to control the movements of said rams, means operatively connecting said rams to said cam to cause one slide to be moved into cutting position while the other is removed therefrom, a second cam rotatably mounted on said crank-shaft but held against axial movement relative thereto, a relatively fixed member cooperating with said second cam to impart axial movement to said crank-shaft on rotation of said second cam, and means for rotating said crank-shaft and said second cam.

6. In a gear cutting machine, a pair of reciprocable tool slides, each having a slot formed therein, a tool mounted on each of said slides, a rotatable crank-shaft, an actuating member operatively connected to said crank-shaft to be oscillated on rotation of said crank-shaft, and means operatively connecting said actuating member to said slides to reciprocate said slides on actuation of said member comprising a pair of blocks mounted on said actuating member for adjustment thereon radially of the axis of oscillation of said member and adapted to be secured fixedly to said member after adjustment, a pair of blocks mounted in the slots of said slides and slidable therein, and means pivotally connecting each of the last named blocks to one of the first named blocks.

7. In a gear cutting machine, a pair of tool slides, a rotatable member for reciprocating the tool slides simultaneously in opposite directions, means for actuating said member, a reciprocable member upon which each tool slide is mounted, means for reciprocating the last named members simultaneously in opposite directions to move the tool slides alternately to and from cutting position, means for moving the reciprocable members bodily together and independently of their reciprocating movements to impart alternate feed and withdrawal movements between the tools and the work, and means for moving the rotatable member bodily with the reciprocable members to maintain alignment of said parts during the feed and withdrawal movements.

8. In a machine for producing gears, a pair of reciprocatory supports, a slide mounted on each support for movement thereon in a direction at right angles to the direction of movement of its support, a tool secured on each slide, a rotary member for moving the slides simultaneously in opposite directions longitudinally of the tooth surfaces of the work, a rotary member for moving said supports simultaneously in opposite directions to move the tools toward and from the work, and means for rotating said members simultaneously in timed relation.

9. In a machine for producing gears, a pair of reciprocatory supports, a slide mounted on each support for movement thereon in a direction at right angles to the direction of movement of the support, a tool mounted on each slide, a crank and means operatively connecting the crank to the slides to simultaneously reciprocate the slides in opposite directions, a rotary cam and means operatively connecting the cam to the supports to reciprocate the same simultaneously in opposite directions to move the tools toward and from the work, and means for rotating the crank and cam in timed relation.

10. In a machine for producing gears, a pair of reciprocatory supports, a slide mounted on each support for movement thereon in a direction at right angles to the direction of movement of the support, a tool secured to each slide, means for moving the supports simultaneously in opposite directions, and means for reciprocating the slides simultaneously in opposite directions in timed relation with the movement of said supports.

11. In a machine for producing gears, a pair of reciprocatory supports, a slide mounted on each support for movement thereon in a direction at right angles to the direction of movement of the support, a tool secured to each slide, means for moving the supports simultaneously in opposite directions, means for reciprocating said slides simultaneously in opposite directions in timed relation with the movement of said supports, and means for moving said supports and the slide-reciprocating means bodily together toward and from the work.

12. In a machine for producing gears, a frame, a pair of rams reciprocably mounted on the frame, a guide carried at one end of each ram, means connected to each ram for reciprocating the rams simultaneously in opposite directions, a slide mounted to reciprocate on each guide in a direction at right angles to the direction of reciprocation of the corresponding ram, means for reciprocating the slides simultaneously in opposite directions in timed relation with the reciprocation of the rams, and means for moving the ram-reciprocating means alternately forward and back in the direction of movement of the ram to impart alternate movements of feed and withdrawal to the tools.

13. In a machine for producing gears, a frame, a pair of rams reciprocably mounted on the frame, a slide reciprocably mounted on each of said rams for movement in a direction at right angles to the direction of movement of the rams, a tool secured to each slide, a rotatable crank shaft, an actuating plate, means operatively connecting the crank shaft to the actuating plate to oscillate the same, means operatively connecting the actuating plate to the slides to reciprocate said slides simultaneously in opposite directions, a cam secured to the crank shaft to rotate therewith, means connecting the cam to the rams to reciprocate said rams simultaneously in opposite directions toward and from the work, means for reciprocating the crank shaft axially to effect feed and withdrawal movements between the tools and the work, and means connecting the crank shaft to the actuating member to move the actuating member bodily with the crank shaft toward and from the work so as to maintain alignment between the actuating member and the tool slides during the feed and withdrawal movements.

14. In a gear cutting machine, a frame, a pair of rams reciprocably mounted on the frame for movement toward and from the work, a tool slide reciprocably mounted on each ram for movement in a direction at an angle to the direction of movement of the ram, a tool secured to each slide, means for simultaneously reciprocating said slides in opposite directions, a rotary cam, means operatively connecting the rams to said cam at diametrically opposed points of the cam path so that the rams move in opposite directions on rotation of the cam, and means for rotating the cam in timed relation with the means for reciprocating the tool slides.

15. In a gear cutting machine, a frame, a pair of rams reciprocably mounted on the frame for movement toward and from the work, a tool slide reciprocably mounted on each ram for movement in a direction at an angle to the direction of movement of the ram, a tool secured to each slide, a crank shaft, means operatively connecting the crank-shaft to the tool slides to reciprocate the tool slides simultaneously in opposite directions, a cam secured to the crank shaft to rotate therewith, means operatively connecting the rams to said cam at diametrically opposed points of the cam path so that the rams move in opposite directions on rotation of the cam, and means for rotating the crank-shaft.

16. In a gear cutting machine, a frame, a pair of rams reciprocably mounted on the frame for movement toward and from the work, a tool slide reciprocably mounted on each ram for movement in a direction at angle to the direction of movement of the ram, a tool secured to each slide, a crankshaft, means operatively connecting the crank shaft to the tool slides to reciprocate the tool slides simultaneously in opposite directions, a cam secured to the crank shaft to rotate therewith, means operatively connecting the rams to said cam at diametrically opposed points of the cam path so that the rams move in opposite directions on rotation of the cam, means for rotating the crank-shaft, and means for moving the crank-shaft axially alternately toward and from the work to effect alternately feed and withdrawal movements of the tools.

LEONARD O. CARLSEN.